United States Patent
Keller et al.

[15] 3,673,276

[45] June 27, 1972

[54] FRICTION ELEMENTS

[72] Inventors: Emil C. Keller, Grosse Pointe; Raymond E. Spokes, Ann Arbor, both of Mich.

[73] Assignee: Abex Corporation, New York, N.Y.

[22] Filed: Feb. 12, 1970

[21] Appl. No.: 10,801

Related U.S. Application Data

[63] Continuation-in-part of Ser. No. 672,326, Oct. 2, 1967, abandoned.

[52] U.S. Cl. ............................260/38, 188/251 A, 260/838, 260/845, 260/DIG. 39
[51] Int. Cl. ................C08g 51/10, C08g 37/18, C08g 37/20
[58] Field of Search......................260/845, 38, DIG. 39, 838; 188/251 A

[56] References Cited

UNITED STATES PATENTS

| | | | |
|---|---|---|---|
| 2,581,926 | 1/1952 | Groten et al. | 260/845 |
| 3,448,071 | 6/1969 | Keller | 260/38 |
| 2,428,298 | 9/1947 | Spokes et al. | 260/38 |
| 2,325,981 | 8/1943 | Sarbach | 260/845 |
| 2,605,248 | 7/1952 | Fisk | 260/845 |

*Primary Examiner*—John C. Bleutge
*Attorney*—Kinzer, Dorn and Zickert

[57] ABSTRACT

A friction element comprising fillers in an organic binder is prepared from a binder comprising a thermosetting phenol-formaldehyde resin, a polymer of cashew nut shell liquid, and a Buna-N rubber. The rubber is to have an acrylonitrile content exceeding a specified limit measured in terms of nitrogen content, namely, upward of 9.8 percent nitrogen.

3 Claims, 1 Drawing Figure

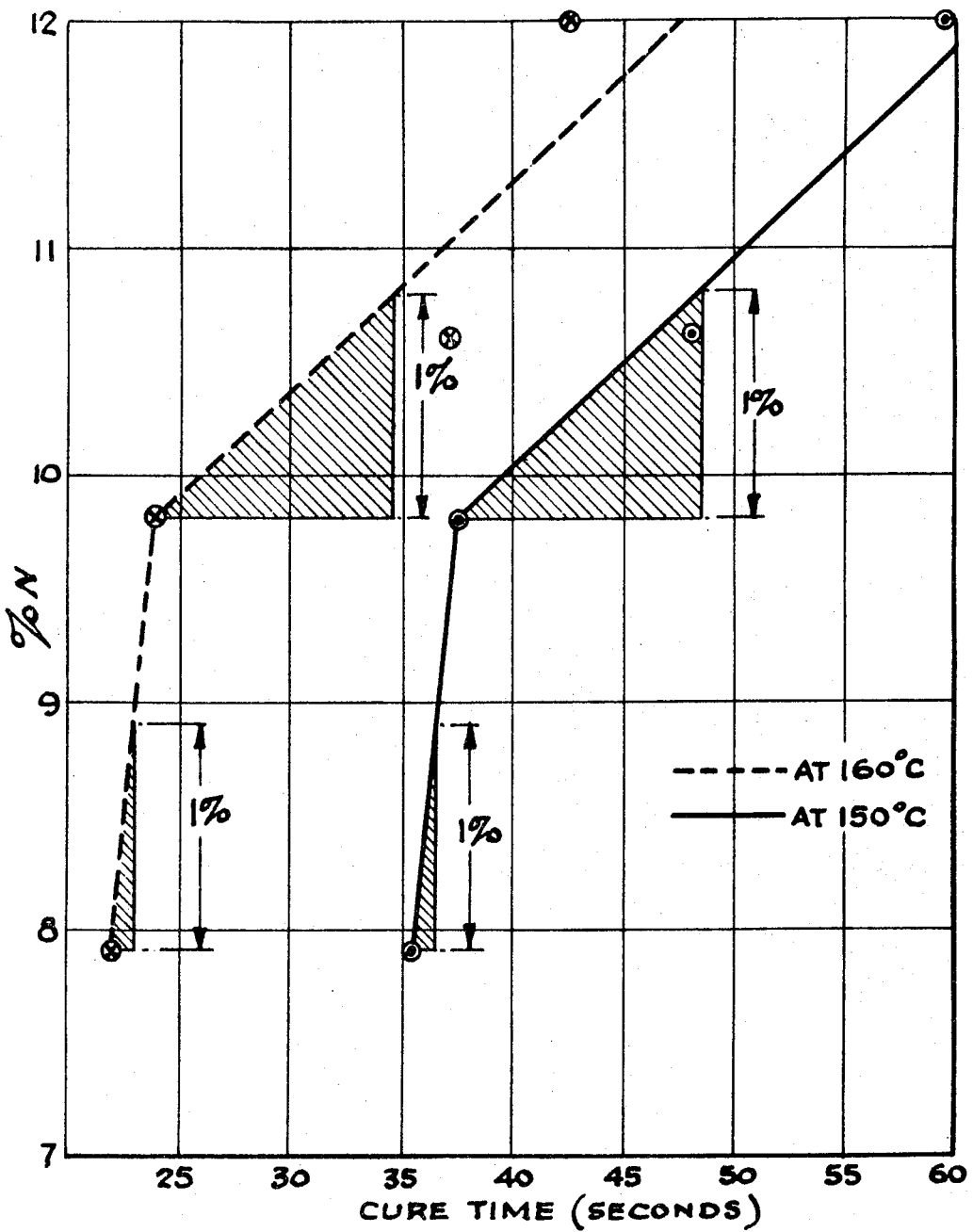

FRICTION ELEMENTS

This application is a continuation-in-part of Ser. No. 672,326 filed Oct. 2, 1967, now abandoned.

One of the most superior binder complexes for friction materials is the product produced from an intimate blend of butadiene-acrylonitrile rubber, cashew nut shell liquid polymer and a thermosetting phenol-formaldehyde resin. While it is believed that some intermolecular reaction occurs between these components during cure, indications are that a portion of the components may cure individually to establish a three-phase binder, primarily indicated by the fact that it is necessary to employ the blended binder in an extremely finely divided powdered state when adding it to the fillers for the friction element.

While excellent heat resistance, friction stability and wear characteristics are achieved in friction materials bonded by the three-component blend disclosed above, processing is critical due to the high degree of reactivity of the three binder components, which is to say that the binder may "kick over" unexpectedly or too suddenly or in an uncontrollable fashion during final curing. By "kick over" is meant that degree of reactivity where the binder complex passes from a reactive, flowable state, to a non-ractive, non-flowable state. This is especially objectionable in manufacture of friction elements where the amount of binder compared to the filler content is quite small, on the order of 15 percent, such that flow or penetration of the binder uniformly throughout the fillers may not be achieved because of unexpected or uncontrolled "kick over". This problem is not encountered in materials having a high binder or rubber content such as hoses and the like.

The foregoing explains our experience in the art, although we cannot assign any scientifically tested reason why the three-component blend should be so critical under curing conditions. The situation could be remedied in part by adjusting the degree of polymerization of the phenolic resin to a less reactive state, or modifying the phenolic chemically to realize the same end, but either approach is both expensive and difficult to control. In an equal sense, a remedy in part could be achieved by lowering the degree of polymerization of the cashew nut shell liquid polymer, but this approach is also accompanied by the presence of extractive materials resulting in an unacceptably high degree of anti-friction or lubricity in the friction element.

Thus it will be seen that adjustment in the phenolic resin only complicates further the control element, and the only feasible adjustment in the cashew material results in loss of friction at the very least. We have found, however, that a Buna-N rubber having a nitrogen content in excess of about 9.8 percent will greatly expand the cure time of the three-component mixture, allowing that much more time for flow and penetration of the binder throughout the filler content, and the primary object of the present invention is to depend upon this selection of a particular Buna-N rubber to extend the cure time of the binder mixture, thereby attaining that much more assurance that the binder will properly penetrate the mixture as a whole before "kicking over" or taking on a final set during final cure of the mixture of fillers and binder which produce a friction element of the desired contour and density.

While the final cure controls—time, pressure and temperature—are of relatively large order, nevertheless curing of the binder component is ultimately a rapid "kick over", and if there is poor flow or penetration of the binder prior to this point in time, the result may be a poor product, weak in nature. Such a poor product may or may not be detected as an aspect of quality control.

It is therefore very significant to attain a wide latitude as to cure time for the binder system, within which friction elements of uniform quality can be obtained, and we attain this latitude in time as another expression of an object of the present invention.

Thus, for friction material binders, employing Buna-N rubber as a component of the binder, along with a straight polymer of cashew nut shell liquid and a thermosetting straight phenol formaldehyde resin, we have established that the critical processing characteristics of this binder complex as heretofore encountered can be overcome to a substantial degree simply by specifying a Buna-N rubber having a nitrogen content of more than about 9.8 percent, representing the specific object of the present invention. The effect of the ratio, acrylonitrile-to-butadiene, is readily noted on hot plate cure time of the three-component blend as hereinafter shown.

Other and further objects of the present invention will be apparent from the following description and claims and are illustrated in the accompanying drawing which, by way of illustration, shows a preferred embodiment of the present invention and the principle thereof and what is now considered to be the best mode contemplated for applying this principle. Other embodiments of the invention embodying the same or equivalent principles may be used and structural changes may be made as desired by those skilled in the art without departing from the present invention.

The drawing is a graph showing critical features of the present invention.

To illustrate the phenomenon of extended cure time constituting a feature of our invention, four nitrile rubbers (Buna-N) of varying acrylonitrile content were selected as follows, the percentage spread for each rubber being the best for practical purposes:

TABLE I

| | |
|---|---|
| Buna-N Rubber A | 34 – 36% acrylonitrile |
| Buna-N Rubber B | 41 – 43% acrylonitrile |
| Buna-N Rubber C | 44 – 46% acrylonitrile |
| Buna-N Rubber D | 50 – 52% acrylonitrile |

For testing, those nitrile rubbers were compounded respectively into a basic friction element binder composition consisting of:

EXAMPLE 1

| | | |
|---|---|---|
| Nitrile Rubber (solid) | 0.96 parts ) by weight ) | |
| Straight Cashew Polymer (solid) | 0.71 parts ) by weight ) | Binder |
| Straight Phenolic Resin (solid) | 5.82 parts ) by weight ) | |

Example 1 was repeated for each of rubbers A, B, C or D. In Table II, these four binder complexes are identified as Binders A, B, C and D. The cashew polymer is a straight or unmodified polymer (solid) of cashew nut shell liquid characterized by a benzol extractive of 12–17 percent by weight as heretofore used in the manufacture of friction elements. The phenolic resin is a straight, unmodified phenol-formaldehyde resin as heretofore used in the manufacture of friction elements.

The ratio of acrylonitrile-to-butadiene has a marked effect on expanding in an unexpected fashion the critical processing time for curing the rubber-polymer-phenolic resin binder; but the general heat resistance character, as evidenced by the heat loss (volatile) and thermal break-down (extractives) does not appear to be materially effected by the examined changes in acrylonitrile-to-butadiene ratio in the rubber component of the three-phase binder. This is illustrated in the following comparisons, where "N" signifies the nitrogen content as a measure of the nitrile ratio.

TABLE II

| Heat Loss | (7.9% N) Binder A | (9.8% N) Binder B | (10.6% N) Binder C | (12% N) Binder D |
|---|---|---|---|---|
| 1 hr. 600° F | 0.96% | 1.09% | 1.07% | 1.37% |
| 1 hr. 700° F | 2.82 | 2.89 | 3.39 | 3.56 |
| 1 hr. 800° F | 9.86 | 10.10 | 9.65 | 9.42 |
| 1 hr. 850° F | 13.20 | 13.02 | 12.00 | 11.98 |
| Extractives (Benzine on above samples after heating) | | | | |
| 1 hr. 600° F | 0.82% | 0.99% | 1.01% | 1.42% |
| 1 hr. 700° F | 4.16 | 4.99 | 5.01 | 3.01 |
| 1 hr. 800° F | 0.92 | 1.68 | 1.69 | 1.06 |
| 1 hr. 850° F | 0.04 | 0.69 | 0.69 | 1.26 |

| Hot Plate Cure | | | | |
|---|---|---|---|---|
| 150°C | 35.5 secs. | 27.5 secs. | 48.0 secs. | 59.0 secs. |
| 160°C | 22.0 secs. | 24.0 secs. | 37.0 secs. | 42.5 secs. |

A hot plate cure of 150° to 160° is typical of an extrapolation of the actual temperatures prevailing during cure of a composition of the kind herein entailed when manufacturing a friction element on a commercial scale. It will be recognized from Table II that within this temperature range, the hot plate cure time may vary from about 22 seconds to about 59 seconds when varying the Buna-N rubber between 7.9 and 12 percent nitrogen by weight.

However, the unexpected result, and our discovery as applied to the manufacture of friction elements, may be best realized from the drawing where it will be observed that for the two hot plate cures a marked expansion or extension of the cure time occurs in the instance of a nitrile content measured in terms of an excess beyond 9.8 percent nitrogen. Both tests show full compliance, and repeated tests confirmed the result that a Buna-N rubber having a nitrogen content in excess of 9.8 percent will partake of sharp break in cure time. For example, the lower shaded areas for the two curves or plots in the drawing reveal that an increase of 1 percent in nitrogen content of the rubber increases the cure time by a mere second or so; but a sharp break occurs at the critical amount of 9.8+ percent nitrogen in that a 1 percent increase in nitrogen content increases the cure time by 10 seconds or so (the cross-hatched areas in the drawing) a tenfold increase which is of exceedingly great benefit in commercial production. The importance of this can be further realized by observing how narrow indeed is the "kick over" band below 9.8 percent nitrogen in comparison to the much greater working area for Buna-N rubbers having a nitrogen content in excess of 9.8 percent.

The examples to follow are working examples concerned with the production of friction elements. In each of these, the binder of Example 1 is used, employing Buna-N Rubber C. However, this basic binder (Example 3) may be reduced in amount while adding either a modified phenolic (Example 2) or a straight phenolic (Example 4) as an additional binder material. The filler particles may vary widely and are not critical since these are selected on the basis of augmentation of wear, more or less friction, softer action and so on, all as well known in the art. In fact, our sole effort in this instance is concerned with the successful endeavor to significantly lengthen the cure time for the binder so that there will be adequate time, during final cure of the composition, for the binder to penetrate, flow through and cover the filler content of the composition adequately to assure uniform production of strong friction elements as the ultimate product. Hence, the filler particles may vary widely within the empiric requirements of strengtheners (e.g. calcium carbonate, barytes, litharge), friction particles, heat resistance (asbestos, brass chips) and wear resistance (mineral abrasives).

EXAMPLE 2

| | Parts by Weight | |
|---|---|---|
| Phenol-formaldehyde modified by a cashew polymer | 14.0 ) | |
| | ) | Binder |
| Example 1 using Rubber C | 5.3 ) | |
| Calcium carbonate | 8.8 | |
| Friction particles (e.g., cashew resin or hard rubber or a mixture) | 18.0 | |
| Brass chips | 5.5 | |
| Mineral abrasive fillers (e.g., silica or alumina) | 3.0 | |
| Magnesia | 2.5 | |
| Asbestos | 44.9 | |

This example shows that the binder may also include a modified phenolic.

EXAMPLE 3

| | Parts by Weight |
|---|---|
| Example 1 Binder; Rubber C | 19.0 |
| Sulphur | 0.1 |
| Friction particles (see Example 2) | 16.0 |
| Brass chips | 10.0 |
| Barytes | 6.6 |
| Basic lead sulphate | 5.0 |
| Mineral abrasives (e.g., silica or alumina) | 2.0 |
| Asbestos | 41.7 |

This example illustrates use of the binder of Example 1 as the sole source of binder.

EXAMPLE 4

| | Parts by Weight | |
|---|---|---|
| Unmodified (straight) phenol-formaldehyde resin | 14.0 ) | |
| | ) | Binder |
| Example 1 using Rubber C | 4.0 ) | |
| Lead powder | 7.0 | |
| Litharge | 7.0 | |
| Friction particles (see Example 2) | 10.0 | |
| Carbonaceous matter (friction modifier) | 3.0 | |
| Mineral abrasives | 3.5 | |
| Asbestos | 51.5 | |

This example illustrates that the binder may be supplemented by a larger proportion of a straight phenol-formaldehyde resin. In preparing the binder of Examples 2, 3 and 4, the cashew polymer is milled on a rubber roll and then the Buna-N (after previous break-down) is milled therewith. This mixture is supplemented with the phenolic and any additional modification for the binder (Example 2 or 4) and the binder, at least a three-component mixture (Example 3) is ground to about 325mesh size.

The binder phase of 325 mesh size is added to the fillers including the friction particles which may themselves be a mixture of synthetic rubber and cashew polymer in a high state of hard cure.

The mixture of binder and fillers is pre-formed in a die defining the general configuration of the friction element, either a conventional automotive lining, a segment for a disc brake, a railroad brake shoe, or the like, the particular configuration depending upon the brake design. The pre-form conditions are about 100 psi at abour 250° F. for about 3½ to 4 minutes.

The pre-form or "green" friction element is then molded under heat and pressure — about 2,000 psi at about 300°–325° F. for about 45 minutes. Following this, the product may be subjected to a final air cure over an extended time, which is standard.

As a practical matter, the Buna-N rubber should be one having a nitrogen content of about 10.5 percent, which is relatively easy to comply with in plant production. Such a percentage is in excess of the 9.8 percent value characterizing the upper limit of the steep cure gradient, the drawing, and is placed well upwards on the slope, the drawing, where a relatively prolonged cure period will be encountered.

As to the proportions of Example 1, this incorporates the optimum amount of Buna-N rubber for superior results based on our experience, and while it will be appreciated that variations in proportions may be used, we prefer to abide by a ratio of rubber:cashew polymer:phenolic of about 1:0.75:6. Further, this three-component complex should be at least about 25 percent of the binder as a whole (Examples 2 and 4); the binder as a whole will not be more than about 20 percent of the entire mixture as a whole, as shown by each example; and the three-component mixture may itself be the entire binder as shown by Example 3.

Each of the phenolics, or phenol formaldehyde resins specified in Examples 1 through 4, is preferably a mixture of a powdered one-step heat hardenable resin and a Novolak (thermoplastic) resin, each made from phenol and formaldehyde and preferably in the ratio of one of the one-step resin to three of the Novolak. The Novolak has a formaldehyde:phenol molar ratio of less than 1:1, while the one-step material has a ratio sufficiently greater than 1:1 to convert the Novolak, by cross-linking, to a thermosetting resin during the heat cure. The final result is as if only a one-step heat hardenable resin had been used.

The reason for using a mixture of the one-step and the Novolak resin, rather than a one-step resin entirely, is to avoid premature reaction toward a completely hardened condition which may be caused during milling with the rubber and cashew. Thus, the two phenolics in powdered form are first pre-blended and then blended, as by milling, with the rubber and the cashew, as explained above. Nonetheless, by careful controls it would be possible to have the phenolic entirely in the form of a one-step resin.

More specifically we rely on the following specifications:

One-step resin:
| | |
|---|---|
| Melting point | 175°–195° F |
| Tack point | 160°–170° F |
| Hot plate cure | 25–40 seconds |
| Volatile | 6% –7% |
| Ash | 20% ($BaSO_4$ to prevent sintering) |

Novolak:
| | |
|---|---|
| Melting point | 180°–210° F |
| Tack point | 165°–170° F |
| Hot plate cure | does not cure within 10 secs. |
| Volatile | 3% –10% |
| Ash | None |

Hence, while we have illustrated and described preferred embodiments of our invention, it is to be understood that these are capable of variation and modification.

What is claimed is:

1. In a method of preparing a friction element for a vehicle brake from a mixture of fillers including asbestos and an organic binder: mixing the fillers with a binder composed of (1) a phenol-formaldehyde resin (2) a straight polymer of cashew nut shell liquid having a benzol extractive of 12–17 percent and (3) Buna-N rubber having a nitrogen content greater than about 9.8 percent, said resin being a mixture of a Novolak and a powdered one-step heat hardenable phenol-formaldehyde resin, and consolidating the mixture of fillers and binder under heat and pressure to the desired configuration and density, consolidation being made in a die cavity having the configuration of the friction element.

2. A method according to claim 1 in which the ratio of rubber:polymer:phenolic complex is about 1:0.75:6 and wherein the complex is present in an amount of not more than about 20 percent by weight of the mixture as a whole.

3. A method according to claim 1 in which the Buna-N rubber has a nitrogen content of about 10.6 percent and up to about 12 percent.

* * * * *